United States Patent [19]

Chaudhari et al.

[11] Patent Number: 5,614,606
[45] Date of Patent: Mar. 25, 1997

[54] POLYAMIC ACIDS AND POLYIMIDES

[75] Inventors: Mohammad A. Chaudhari, Bethel; John J. King, Ridgefield; Byung Lee, Brookfield, all of Conn.

[73] Assignee: Ciba-Geigy Corporation, Tarrytown, N.Y.

[21] Appl. No.: 948,279

[22] Filed: Dec. 31, 1986

[51] Int. Cl.$^6$ ................................ C08G 73/10
[52] U.S. Cl. ................ 528/353; 528/125; 528/128; 528/172; 528/173; 528/176; 528/183; 528/188; 528/220; 528/229; 528/350; 264/241; 264/331.11; 264/331.19
[58] Field of Search ............................ 528/353

[56] References Cited

U.S. PATENT DOCUMENTS

| | | | |
|---|---|---|---|
| 3,105,839 | 10/1963 | Renner | 260/346.3 |
| 3,528,950 | 9/1970 | Lubowitz | 260/78.4 |
| 3,803,081 | 4/1974 | Lubowitz | 260/37 N |
| 3,856,752 | 12/1974 | Bateman et al. | 260/65 |
| 4,414,269 | 11/1983 | Lubowitz et al. | 428/290 |
| 4,584,364 | 4/1986 | Lubowitz et al. | 528/128 |

FOREIGN PATENT DOCUMENTS 2002378  2/1979  United Kingdom.

*Primary Examiner*—Charles T. Jordan
*Assistant Examiner*—John R. Hardee
*Attorney, Agent, or Firm*—Harry Falber; William A. Teoli, Jr.

[57] ABSTRACT

Polyamic acids and corresponding polyimides are prepared by reacting polyfunctional amines, aromatic polyfunctional anhydrides or esters thereof, and allyl-nadic anhydride end capping agents, the resulting products exhibiting excellent properties and being suitable for the preparation of prepregs, composites, adhesives, coatings, and the like.

18 Claims, No Drawings

POLYAMIC ACIDS AND POLYIMIDES

Advanced fiber reinforced polymeric matrix composites are finding increased use in the fabrication of high performance aerospace structural components. Current advanced composites are generally based on epoxy matrices which have many desirable performance and processing characteristics but have the disadvantage of having limits of upper use temperature of 175°–205° C.

High temperature polymers e.g. polyimides, polybenzimidizoles, polyphenylquinoxalines, and the like, have been known to researchers for considerable lengths of time but the intractable nature of these materials has prevented the realization of their full potential as matrix resins for high temperature polymer matrix composites.

Polyimide resins, for example, are noted for their outstanding physical and chemical properties, particularly their high temperature thermal stability and high temperature strength. In view of these attractive properties, polyimides have found numerous applications in fields of advancing technology where high-strength, high-temperature materials are required. While these outstanding properties render the polyimides attractive for many and specific applications, various problems have limited the full potential use of polyimides.

Approaches to resolving certain of these disadvantages have been disclosed, for example, in U.S. Pat. No. 3,528,950, U.S. Pat. No. 3,745,149 and U.S. Pat. No. 3,803,081. In general, these patents disclose the preparation of polyimides wherein polyfunctional amines and polyfunctional anhydrides are coreacted with end-capping monoanhydrides in an attempt to alleviate processing, stability and economic disadvantages. More specifically, the process of U.S. Pat. No. 3,745,149 consists of impregnating reinforcing fibers with the monomer mixture dissolved in low boiling solvents such as alkyl alcohols. The monomer mixture undergoes sequential in-situ condensation and ring opening addition crosslinking reactions at elevated temperature to form the polyimide resin. However, this approach also exhibits disadvantages in that the reactive monomer solution has limited shelf life; during processing, the monomers undergo sequential in-situ condensation and ring opening giving rise to cyclopentadiene which is alleged to further react with the maleic entity but during actual composite fabrication the evolution of cyclopentadiene leads to the formation of voids giving lower quality laminates; and processing of such polyimides generally requires high temperature and pressure conditions.

It has now been discovered that meaningful improvements can be achieved by replacing the monofunctional anhydride end capping agents of the prior art with an allylnadic anhydride end capping agent. In particular, reinforced composites can be fabricated with these systems using lower temperature and pressure conditions. These polyimides have excellent solubility in common organic solvents and have extremely good thermal/mechanical properties and, unlike the prior art, have good toughness characteristics.

Benefits are particularly noted as follows:

1. Polyamic acid and polyimides having been allylnadic end-capped are soluble in polar organic solvents in very high concentrations unlike the intractable nature of the prior art polyimides.
2. The products of the instant invention can be used for composites and coatings, and laminating, film and adhesive applications.
3. They can be processed at comparatively lower temperature/pressure conditions in the area of 260°–290° C./50–150 psi.
4. Both the resulting polyamic acid and polyimide materials are stable at room temperature.
5. Unlike prior art polyimides, the materials have excellent toughness characteristics.
6. The polyimides of the invention are extremely useful in that they can be dissolved in common organic solvents in high concentrations (>50%) and the solutions can then be employed for composite fabrications, adhesive varnishes or coating applications.
7. The inventive approach allows for production of the final product from solution without the necessity for using a polyamic acid intermediate with a subsequent conversion step.
8. Thermal mechanical properties are substantially improved.

In preparing the systems of this invention, various polyfunctional amines, including diamines and triamines, but excluding phenylindane diamines, may be used either alone or in combination in any relative proportion, e.g., from 0 to 100 percent by weight. However, the preferred polyfunctional amines include the diamines, e.g. aromatic amines containing at least one benzene ring and preferably two benzene rings. The aliphatic amines may have 5 to 22 carbon atoms per molecule as illustrated below:

2,5-dimethylhexamethylene diamine
2,5-dimethylheptamethylene diamine
5-methyl-nonamethylene diamine
2,17-diamino-eicosadecane
1,4-diamino-cyclohexane
1,10-diamino-1,10-dimethyldecane
1,12-diamino-octadecane
para-phenylenediamine
meta-phenylenediamine
4,4'-diamino-diphenylpropane
4,4'-diamino-diphenylmethane
benzidine
4,4'-diamino-diphenyl sulfide
4,4'-diamino-diphenyl sulfone
3,3'-diamino-diphenyl sulfone
4,4'-diamino-diphenyl ether
1,5-diamino-naphthalene
3,3'-dimethoxy benzidine
2,4-bis(beta-amino-t-butyl)toluene
bis-(para-beta-amino-t-butylphenyl)ether
bis-(para-beta-methyl-delta-amino-pentyl)benzene
bis-(para-1,1-dimethyl-5-amino-pentyl)benzene
1-isopropyl-2,4-metaphenylene diamine
m-xylylene diamine
hexamethylene diamine
heptamethylene diamine
octamethylene diamine
nonamethylene diamine
decamethylene diamine
diamino-propyl tetramethylene diamine
3-methylheptamethylene diamine
4,4'-dimethylheptamethylene diamine
2,11-diamino-dodecane
1,2-bis(3-aminopropoxy)-ethane
2,2-dimethyl propylene diamine
3-methoxy-hexamethylene diamine 3,3'-dimethyl benzidine etc.
and triamines such as 1,3,5-triaminobenzene 2,4,6-triamino-s-triazine 1,2,3-triaminopropane 4,4',4"-triaminotriphenylmethane 4,4',4"-triaminotriphenylcarbinol As the preferred aromatic diamines, there may be mentioned $C_6-C_{10}$ arylene diamines such as p-phenylenediamine, m-phenylenediamine and m-xylylenediamine, bis(p-aminophenyl) methane, N,N,N',N'-tetramethyl-4,4'-diaminodiphenylmethane, and the like.

The polyfunctional anhydrides and esters thereof correspond to the formulae

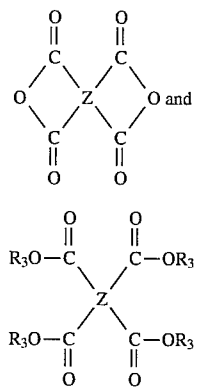

wherein Z is a tetravalent aryl radical; and $R_3$ is hydrogen or $C_1-C_6$ alkyl, with at least two $R_3$ groups being alkyl.

The aryl radical may, for example, be substituted or unsubstituted phenyl, naphthyl or biphenyl rings or two phenyl rings linked by $O, S, SO_2$, carbonyl, carboxy or alkylene, or aryl rings containing heterocyclic atoms such as pyrazine or thiophene.

The following species are typical of tetracarboxylic acid dianhydrides suitable for practicing the invention:

2,3,9,10-perylene tetracarboxylic acid dianhydride 1,4,5,9-naphthalene tetracarboxylic acid dianhydride 2,6-dichloronaphthalene-1,4,5,8-tetracarboxylic acid dianhydride 2,7-dichloronaphthalene-1,4,5,8-tetracarboxylic acid dianhydride 2,3,6,7-tetrachloronaphthalene-1,4,5,8-tetracarbox-yl ic acid dianhydride phenanthrene-1,8,9,10-tetracarboxylic acid dianhydride 2,3,3',4'-benzophenonetetracarboxylic acid dianhydride 3,3',4,4'-benzophenonetetracarboxylic acid dianhydride 2,2',3,3'-benzophenonetetracarboxylic acid dianhydride 3,3',4,4'-biphenyltetracarboxylic acid dianhydride 2,2', 3,3'-biphenyltetracarboxylic acid dianhydride 4,4'-isopropylidenediphthalic anhydride 3,3'-isopropylidenediphthalic anhydride 4,4'-oxydiphthalic anhydride 4,4'-sulfonyldiphthalic anhydride 3,3'-oxydiphthalic anhydride 4,4'-methylenediphthalic anhydride 4,4'-thiodiphthalicanhydride 4,4'-ethylidenediphthalic anhydride 2,3,6,7-naphthalenetetracarboxylic acid dianhydride 1,2,4,5-naphthalenetetracarboxylic acid dianhydride 1,2,5,6-naphthalenetetracarboxylic acid dianhydride benzene-1,2,3,4-tetracarboxylic acid dianhydride pyrazine-2,3,5,6-tetracarboxylic acid dianhydride thiophene-2,3,4,5-tetracarboxylic acid dianhydride, and the indicated esters thereof.

Such anhydrides and esters and methods for their preparation are disclosed in U.S. Pat. No. 3,745,149 and U.S. Pat. No. 3,856,752, such teachings being fully incorporated herein.

The monofunctional anhydride end-capping agents correspond to the formula

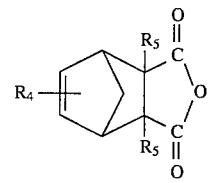

wherein $R_4$ is allyl or methallyl; and $R_5$ is hydrogen or $C_1-C_6$ alkyl.

Anhydrides wherein $R_4$ is allyl or methallyl and $R_5$ is hydrogen are preferred for purposes of this invention. Such anhydrides and methods for their preparation are disclosed in U.S. Pat. No. 3,105,839.

The polyamic acids or polyimides are prepared by reacting the polyfunctional amine, polyfunctional anhydride or ester and monoanhydride at temperatures ranging from 0° to 25° C. in the presence of a solvent. It is possible to prepare mixtures of polyamic acids and polyimides depending on the reaction temperature. The components may be reacted in any order, although it is preferred to first react the polyfunctional and monofunctional anhydrides and then the polyfunctional amine. The reactants are utilized in approximately stoichiometric proportions, i.e. the equivalence of amine calculated to equal substantially the equivalence of the total anhydride content. However, an excess, e.g. of up to about 5% of either group, may be utilized. Where the polyamic acid is prepared, imidization may be accomplished by known techniques, for example, by chemical or thermal imidization.

The organic solvents which may be utilized in preparing the polymers include various organic liquids whose functional groups do not react with the prepolymers. Normally, organic solvents comprising the N,N-dialkylcarboxylamines are useful. The preferred solvents, however, are the lower molecular weight materials including N,N-dimethylformamide, N,N-dimethylacetamide, N,N-diethylformamide, N,N-diethylacetamide, etc. In addition, solvents which may be used include dimethylsulfoxides, N-methyl-2-pyrrolidone, pyridine, formamide, N-methylformamide, butyrolactone, etc. These solvents may be used either alone or in combination with other organic liquids, including for example, benzene, dioxane, butyrolactone, toluene, xylene, cyclohexane, and various mixtures thereof in any proportion.

The resulting polyamic acid and polyamide polymers will generally have average molecular weights ranging from 2,000–20,000, and preferably 2,000–10,000. The polymers are readily soluble in organic solvents such as chloroform, dimethylacetamide, N-methylpyrrolidone and methylene chloride.

The subsequent curing of the polymers of this invention is within the knowledge of the art. Curing is effected at temperatures of between 100° to 250° for the appropriate period of time.

Upon curing at elevated temperatures, a network of high crosslink density occurs. Accordingly, the expression "cure" as used herein, denotes the conversion of the polymers into insoluble and infusible crosslinked products, with simultaneous shaping to give shaped articles such as castings, pressings or laminates, or to give two dimensional structures such as coatings, enamels or adhesive bonds. The modified systems are advantageous for the formation of coatings because of the improved toughness of the resulting cured coatings.

The polymers prepared according to the invention can furthermore be mixed, at any stage before cure, with usual modifiers such as extenders, fillers and reinforcing agents, pigments, dyestuffs, organic solvents, plasticizers, tackifiers, rubbers, accelerators, diluents, and the like. As extenders, reinforcing agents, fillers and pigments which can be employed in the curable mixtures according to the invention there may be mentioned, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aeorsil"), lithopone, barite, titanium dioxide, carbon black, graphite, iron oxide, or metal powders such as aluminum powder or iron powder. It is also possible to add other usual additives, for example, flameproofing agents, agents for conferring thixotropy, flow control agents such as silicones, cellulose acetate butyrate, polyvinyl butyrate, waxes, stearates and the like (which are in part also used as mold release agents) to the curable mixtures.

It is also possible in adhesive formulations, for example, to add rubbers such as carboxyl-terminated acrylonitrile-butadiene rubber, modifying resins such as triglycidyl p-aminophenol and accelerators such as boron trifluoride monoethylamine complexes or imidazole complexes.

The curable mixtures can be manufactured in the usual manner with the aid of known mixing equipment (stirrers, kneaders, rollers and the like).

The polymers of this invention are distinguished by ready solubility in solvents, stability in melt or solution form and good thermal mechanical properties of the products when properly cured, for example, good flexural and shear strength or interlaminar shear strength. Products obtained with them have good mechanical, thermal and electrical properties, have high glass transition temperatures and are substantially non-brittle. The polymers of this invention can also be readily applied from the melt, especially without the addition of non-volatile solvents, for example, for impregnation.

Polyimide polymers such as those described above have application in a broad range of end uses such as in composites, printed circuit boards, castings, molding compounds, adhesives and coatings. In view of the improved performance characteristics, the application of greatest interest is in high performance composite applications, pertinent, for example, to the aerospace industry. Thus, the polyimide resins are utilized to pre-impregnate various fibers for eventual use as honeycomb skins or structural parts. Techniques for preparing prepregs are well known to those skilled in the art. In terms of honeycomb skins and structural parts, graphite, glass, Kevlar reinforced skins and parts as well as others, can be readily prepared from the instant systems. Correspondingly, techniques for preparing laminates are well known. Such laminates may be prepared by compression or autoclave molding and may comprise a broad range of thicknesses. A further preferred area of use is adhesion promotion wherein the instant systems effectively improve adhesive performance characteristics.

The following examples illustrate the preferred embodiments of this invention. In these examples, all parts given are by weight unless otherwise noted.

EXAMPLE I

Under a nitrogen atmosphere with constant stirring, a solution of 110.0 grams (0.6 mole) bis(p-aminophenyl) methane in 400 grams N-methylpyrrolidone (NMP) is cooled to 10° C. in an ice-water bath. Thereafter, a solution of 81.7 grams (0.4 mole) allylnadic anhydride in 95 grams NMP is slowly added to maintain the temperature of the reaction mixture under 20° C. The ice bath is removed, stirring continued for one hour at room temperature, the ice bath reintroduced and 128.9 grams (0.4 mole) benzophenonetetracarboxylic acid dianhydride slowly added with additional NMP for full solubilization.

The amic acid material is precipitated in water, washed with water and dried at 100° C. under reduced pressure for 24 hours.

EXAMPLE II

A solution of 322.3 grams (1.0 mole) of benzophenonetetracarboxylic acid dianhydride in 1.5 kilograms NMP is cooled with an ice bath to 15° C. whereupon 297.5 grams (1.5 mole) bis (p-aminophenyl)methane is slowly added to maintain the temperature below 30° C. The ice bath is removed and 204.3 grams (1.0 mole) allyl nadic anhydride is added. After complete addition, stirring is continued for four hours at room temperature.

The resulting solution is divided into portions with a 726.7 gram portion being diluted with 500 ml. dimethylformamide and being imidized by the addition of 1.3 grams nickel acetate, 22.4 grams triethylamine and 100 grams acetic anhydride with stirring for four hours at 60° C. A yellow precipitate is formed which is then washed and dried to provide 206.0 grams of a yellow powder (imidized product).

A second 500 ml. portion of the unreacted solution is diluted with dimethylformamide and precipitated into 5.0 liters of water. A white precipitate is formed which upon washing and drying provides 151.8 grams of a pale yellow powder (amic acid product).

The polyamic acid and polyimide of Examples I and II can be readily utilized to prepare various laminate configurations which exhibit good physical and mechanical properties.

Summarizing, it is seen that this invention provides improved polyimide systems, said improvements stemming from the introduction of allylnadic anhydride as an end-capping agent. Variations may be made in procedures, proportions and materials without departing from the scope of the invention as defined by the following claims.

What is claimed is:

1. A polyamic acid obtained from the reaction of
   (a) a non-phenylindane-containing polyfunctional amine;
   (b) a polyfunctional anhydride or ester thereof of the formula

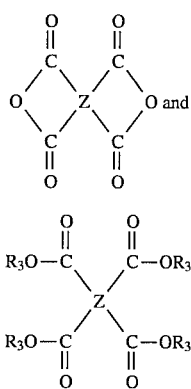

wherein Z is a tetravalent aryl radical; and $R_3$ is hydrogen or $C_1$–$C_6$ alkyl, with at least two $R_3$ groups being alkyl; and (c) a monofunctional anhydride of the formula

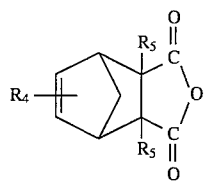

wherein $R_4$ is allyl or methallyl; and $R_5$ is hydrogen or $C_1$–$C_6$ alkyl.

2. The polyamlc acid of claim 1 having an average molecular weight of 2,000–20,000.

3. The polyamic acid of claim 1, wherein component (a) is an aromatic diamine.

4. The polyamic acid of claim 3, wherein said aromatic diamine is bis(p-aminophenyl)methane.

5. The polyamic acid of claim 1, wherein component (b) is benzophenonetetracarboxylic acid dianhydride.

6. The polyamic acid of claim 1, wherein $R_4$ is allyl or methallyl and each $R_5$ is hydrogen.

7. The polyamic acid of claim 6, wherein component (c) is allylnadic anhydride.

8. A polyimide obtained from the imidization reaction of the polyamic acid of claim 1.

9. The polyimide of claim 8, having an average molecular weight of 2,000–20,000.

10. The polyimide of claim 8, wherein component (a) is an aromatic diamine.

11. The polyimide of claim 10, wherein said aromatic diamine is bis(p-aminophenyl)methane.

12. The polyimide of claim 8, wherein component (b) is benzophenonetetracarboxylic acid dianhydride.

13. The polyimide of claim 8, wherein $R_4$ is allyl or methallyl and each $R_5$ is hydrogen.

14. The polyimide of claim 13, wherein component (c) is allylnadic anhydride.

15. The product obtained by curing the polyamic acid of claim 1.

16. The product obtained by curing the polyimide of claim 8.

17. A laminate structure comprising the cured product of wound fibers impregnated with the polyamic acid of claim 1.

18. A laminate structure comprising the cured product of wound fibers impregnated with the polyimide of claim 8.

* * * * *